United States Patent
Kim et al.

(10) Patent No.: US 9,519,174 B2
(45) Date of Patent: Dec. 13, 2016

(54) METAL MESH TYPE TOUCH SCREEN PANEL

(71) Applicant: LG Display Co., Ltd., Seoul (KR)

(72) Inventors: Dongsup Kim, Incheon (KR);
Byungkoo Kang, Gyeonggi-do (KR);
Sohyung Lee, Gyeonggi-do (KR);
Sungyong Cho, Seoul (KR)

(73) Assignee: LG Display Co., Ltd., Seoul (JP)

( * ) Notice: Subject to any disclaimer, the term of this patent is extended or adjusted under 35 U.S.C. 154(b) by 176 days.

(21) Appl. No.: 14/049,569

(22) Filed: Oct. 9, 2013

(65) Prior Publication Data

US 2014/0111709 A1    Apr. 24, 2014

(30) Foreign Application Priority Data

Oct. 23, 2012    (KR) .................... 10-2012-0117940

(51) Int. Cl.
| | |
|---|---|
| *G06F 3/041* | (2006.01) |
| *G06K 11/06* | (2006.01) |
| *G08C 21/00* | (2006.01) |
| *G02F 1/1333* | (2006.01) |
| *G06F 3/044* | (2006.01) |

(52) U.S. Cl.
CPC .......... *G02F 1/13338* (2013.01); *G06F 3/044* (2013.01); *G06F 2203/04111* (2013.01); *G06F 2203/04112* (2013.01)

(58) Field of Classification Search
CPC .................. G02F 1/13338; G06F 2203/04111; G06F 2203/04112; G06F 3/044
See application file for complete search history.

(56) References Cited

U.S. PATENT DOCUMENTS

| | | | |
|---|---|---|---|
| 2010/0073310 A1 | 3/2010 | Liang et al. | |
| 2011/0291968 A1* | 12/2011 | Kawazoe | G06F 3/045 345/173 |
| 2012/0056664 A1 | 3/2012 | Nam | |
| 2012/0098762 A1 | 4/2012 | Kim et al. | |

(Continued)

FOREIGN PATENT DOCUMENTS

GB    2476131 A    6/2011

OTHER PUBLICATIONS

Communication dated May 3, 2016 from the European Patent Office in counterpart European application No. 13186931.5.

*Primary Examiner* — Kumar Patel
*Assistant Examiner* — Insa Sadio
(74) *Attorney, Agent, or Firm* — Morgan, Lewis & Bockius LLP (57) ABSTRACT

A touch screen panel includes a plurality of first touch electrode serials arranged in a first direction, a plurality of second touch electrode serials arranged in a second direction crossing the first direction, and an insulating layer insulating the first touch electrode serials and the second touch electrode serials. Each first touch electrode serial includes a plurality of first mesh patterns formed by an intersection of first metal lines. Each second touch electrode serial includes a plurality of second mesh patterns formed by an intersection of second metal lines. The first mesh patterns are connected to one another, and the second mesh patterns are separated from one another. The separated first mesh patterns are connected to one another through a bridge.

12 Claims, 9 Drawing Sheets

(56) References Cited

U.S. PATENT DOCUMENTS

2012/0194481 A1* 8/2012 Frey .................. G06F 3/044
                                                                            345/175
2012/0234663 A1* 9/2012 Hwang .............. G06F 3/044
                                                                            200/600

\* cited by examiner

FIG. 1

(RELATED ART)

FIG. 2

(RELATED ART)

METAL MESH TYPE TOUCH SCREEN PANEL

This application claims the benefit of priority under 35 U.S.C. §119(a) to Korea Patent Application No. 10-2012-0117940 filed on Oct. 23, 2012, the entire contents of which is incorporated herein by reference herein in its entirety.

BACKGROUND OF THE INVENTION

Field of the Invention

Embodiments of the invention relate to a touch screen panel, and more particularly, to a metal mesh type touch screen panel capable of solving a limitation of the size of the touch screen panel resulting from resistance capacitance (RC) delay.

Discussion of the Related Art

In recent years, display devices, such as a liquid crystal display, an electroluminescent display, and a plasma display panel, having a fast response time, low power consumption, and an excellent color reproduction rate, have been in the spotlight. These display devices have been used for various electronic products such as a television, a monitor for a computer, a laptop computer, a mobile phone, a display unit of a refrigerator, a personal digital assistant, and an automated teller machine. In general, these display devices interface with various input devices such as a keyboard, a mouse, and a digitizer. However, in order to use a separate input device such as the keyboard and the mouse, a user has to deal with the inconveniences of learning how to use it and taking up space, thus making it difficult to improve the degree of completion of the product. Therefore, the demand for input devices that are convenient and easy to use and reduce an erroneous operation is gserialing more and more. In response to this demand, a touch screen panel for enabling a user to input information by directly touching the screen with his or her hand or a pen was suggested.

Because the touch screen panel has a simple configuration, causes few erroneous operations, can perform an input operation without a separate input device, and offers the convenience of allowing the user to quickly and easily manipulate content displayed on the screen, the touch screen panel is applied to various display devices.

Touch screen panels are classified into a resistive type, a capacitive type, an electromagnetic type, etc. based on a method for sensing a touched portion. The resistive touch screen panel determines a touched position by a voltage gradient based on changes of resistance in a state where a DC voltage is applied to metal electrodes formed on an upper plate or a lower plate. The capacitive touch screen panel senses a touched position based on changes in capacitance generated in an upper plate or a lower plate when the user touches an equipotential conductive film formed on the upper or lower plate. The electromagnetic touch screen panel senses a touched portion by reading an LC value induced when an electronic pen touches a conductive film.

Figure 1:
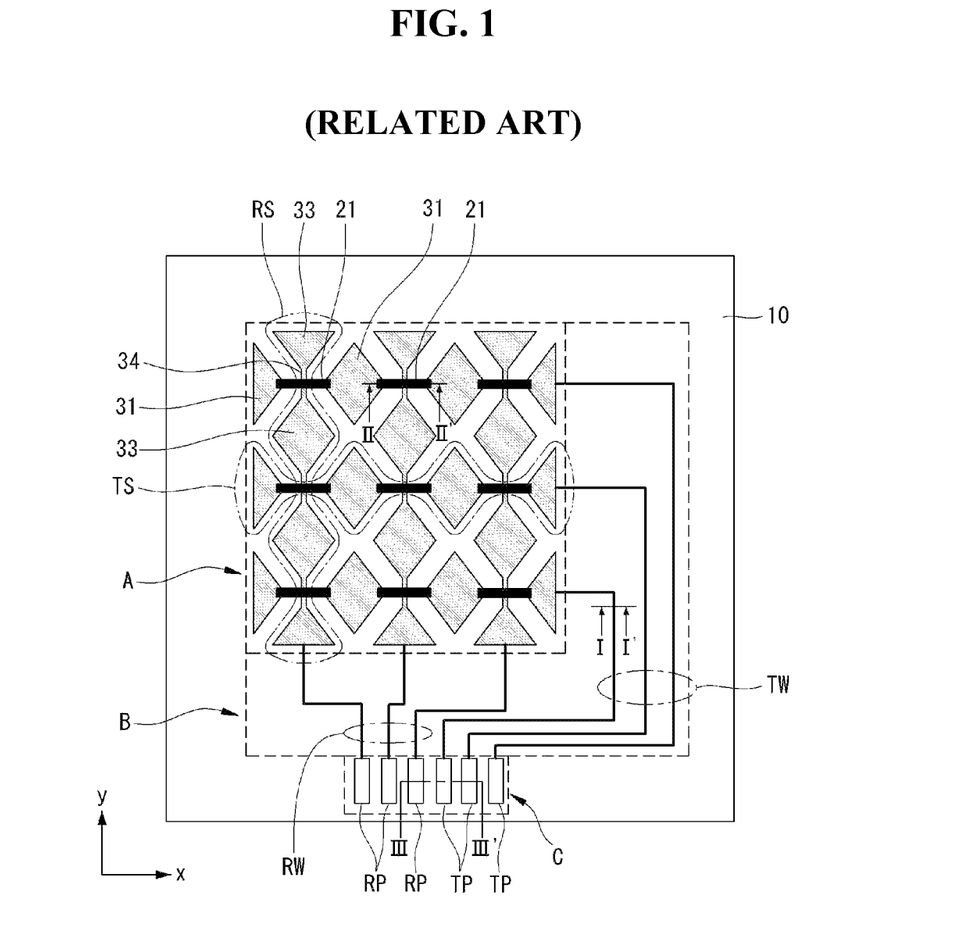
FIG. 1 is a plan view of a related art touch screen panel.
Figure 2:
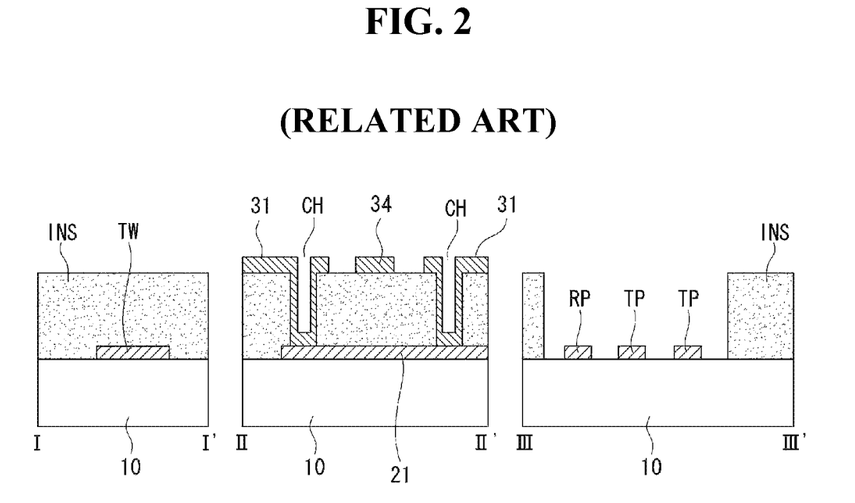
FIG. 2 is a cross-sectional view taken along lines I-I', and of FIG. 1.

Hereinafter, a related art capacitive touch screen panel is described with reference to FIGS. 1 and 2. FIG. 1 is a plan view of a related art capacitive touch screen panel. FIG. 2 is a cross-sectional view taken along lines I-I', II-II', and III-III' of FIG. 1.

As shown in FIGS. 1 and 2, the related art capacitive touch screen panel includes an electrode forming part A, a routing wiring part B, and a pad part C.

The electrode forming part A includes a plurality of first touch electrode serials TS arranged in parallel in a first direction (for example, x-axis direction), a plurality of second touch electrode serials RS arranged in parallel in a second direction (for example, y-axis direction) crossing the first direction, and an insulating layer INS for electrically insulating the first touch electrode serials TS and the second touch electrode serials RS.

Each of the first touch electrode serials TS includes a plurality of first electrode patterns 31 and a plurality of first connection patterns 21 for connecting the adjacent first electrode patterns 31. The adjacent first electrode patterns 31 are connected to the first connection patterns 21 exposed through contact holes CH formed in the insulating layer INS. Each of the second touch electrode serials RS includes a plurality of second electrode patterns 33 and a plurality of second connection patterns 34 for connecting the adjacent second electrode patterns 33. The second electrode patterns 33 and the second connection patterns 34 are integrated to form an integral body.

The routing wiring part B is formed outside the electrode forming part A. The routing wiring part B includes a plurality of first routing wires TW respectively connected to the plurality of first touch electrode serials TS and a plurality of second routing wires RW respectively connected to the plurality of second touch electrode serials RS.

The pad part C includes a plurality of first pads TP respectively connected to the plurality of first touch electrode serials TS through the plurality of first routing wires TW and a plurality of second pads RP respectively connected to the plurality of second touch electrode serials RS through the plurality of second routing wires RW.

In the above-described related art capacitive touch screen panel, the first touch electrode serials TS and the second touch electrode serials RS are formed of a transparent electrode material such as indium tin oxide (ITO). However, ITO used in the first and second touch electrode serials has an electric resistance much greater than a general metal material, and the first and second touch electrode serials are formed in a surface electrode form. Therefore, as the size of the touch screen panel increases, the RC delay, which is a factor reducing the touch accuracy of the touch screen panel, increases. Accordingly, a way capable of reducing the RC delay of the touch screen panel has been demanded so as to solve the problem.

SUMMARY OF THE INVENTION

Embodiments of the invention provide a metal mesh type touch screen panel capable of increasing the accuracy of touch recognition by improving a phenomenon of resistance capacitance (RC) delay, and applicable to medium and large sized touch screen panels irrespective of the RC delay even if the size of the touch screen panel increases.

In one aspect, there is a touch screen panel comprising a plurality of first touch electrode serials arranged in a first direction, a plurality of second touch electrode serials arranged in a second direction crossing the first direction to cross the plurality of first touch electrode serials, and an insulating layer configured to insulate the plurality of first touch electrode serials and the plurality of second touch electrode serials, wherein each of the plurality of first touch electrode serials includes a plurality of first mesh patterns formed by an intersection of first metal lines, wherein each of the plurality of second touch electrode serials includes a plurality of second mesh patterns formed by an intersection of second metal lines, wherein the plurality of first mesh patterns are connected to one another, and the plurality of second mesh patterns are separated from one another, wherein the separated first mesh patterns are connected to one another through a bridge.

The insulating layer is formed at crossings of the first touch electrode serials and the second touch electrode serials. The bridge is formed on the insulating layer and connects the separated mesh patterns.

The insulating layer is formed at crossings of the first touch electrode serials and the second touch electrode serials. The bridge is formed under the insulating layer and connects the separated mesh patterns.

The bridge includes at least one first bridge metal line having at least one curved portion. Both ends of the at least one first bridge metal line connect the separated mesh patterns.

The bridge further includes at least one second bridge metal line having at least one curved portion. The at least one first bridge metal line and the at least one second bridge metal line cross each other and form the same mesh pattern as the first mesh pattern or the second mesh pattern.

Ends protruding from a crossing between the at least one first bridge metal line and the at least one second bridge metal line have I-shape, T-shape, and Y-shape.

Each of the first and second metal lines has a width of about 2 μm to 15 μm. A distance between the first metal lines and a distance between the second metal lines are about 50 μm to 500 μm. A distance between the separated mesh patterns is about 5 μm to 200 μm.

The first and second metal lines are selected among metal materials such as Al, AlNd, Mo, MoTi, Cu, Cr, Ag, and Ag-based alloys.

In the metal mesh type touch screen panel according to the embodiments of the invention, because the touch electrodes are formed using a metal material having a relatively low specific resistance instead of ITO having a high specific resistance, the touch sensitivity of the touch screen panel may be improved through a reduction in the resistance.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

Figure 3:
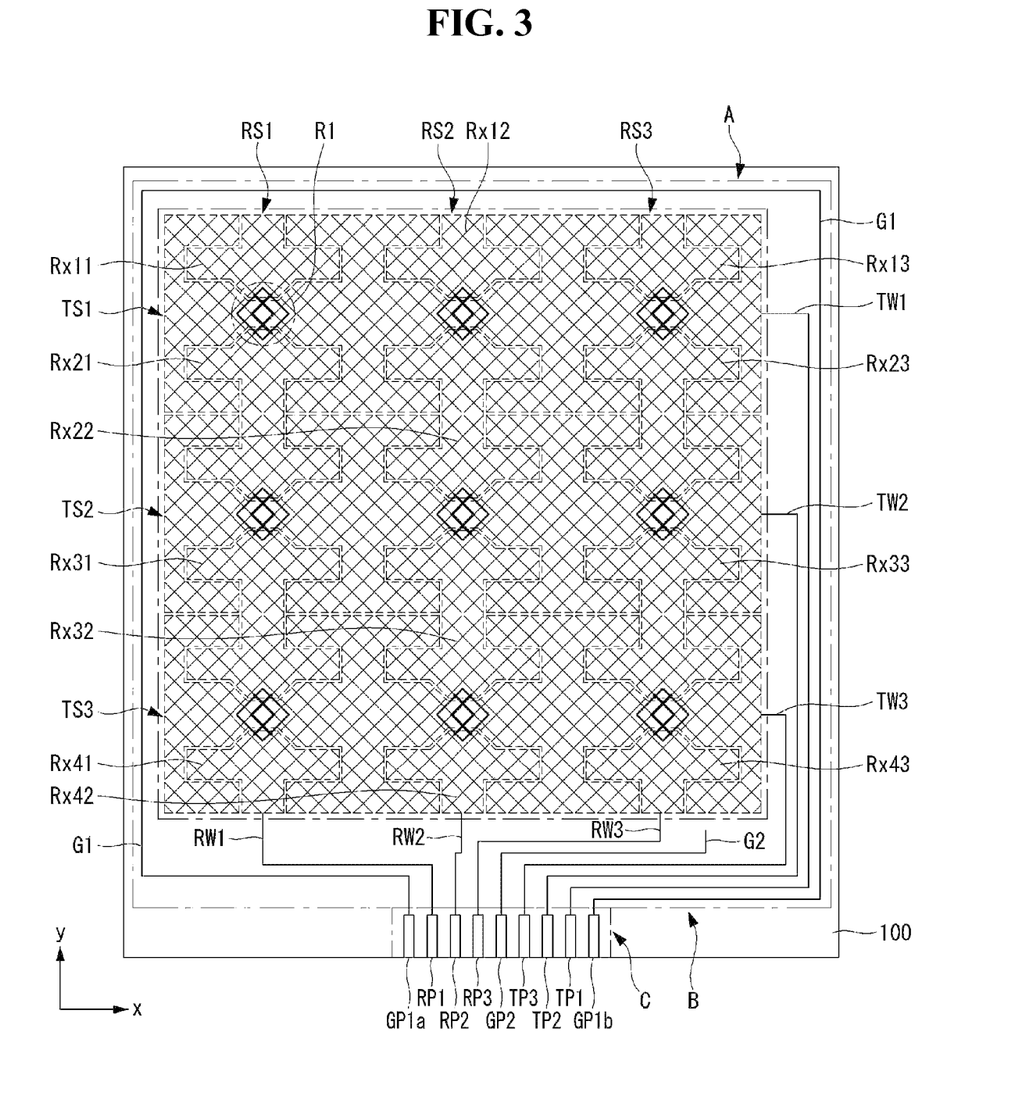
FIG. 3 is a plane view of a metal mesh type touch screen panel according to an exemplary embodiment of the invention.
Figure 4A:
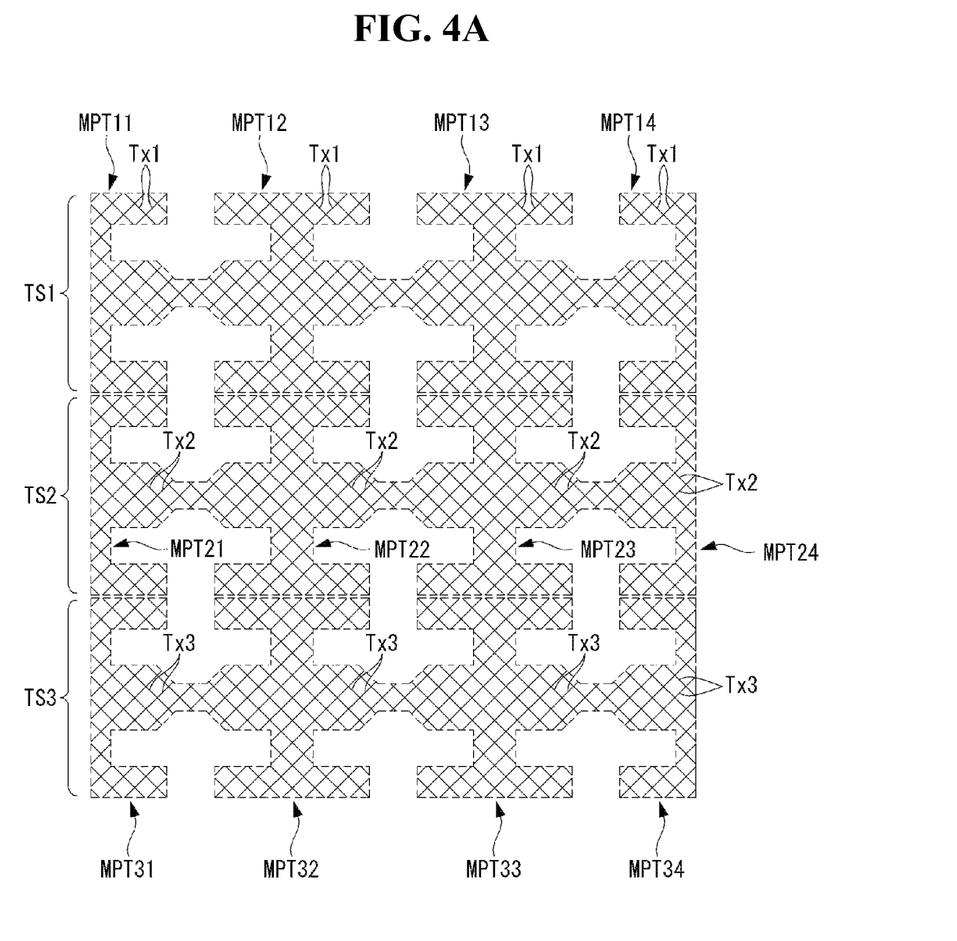
FIG. 4A is a plane view showing first touch electrode serials of the metal mesh type touch screen panel shown in FIG. 3.
Figure 4B:
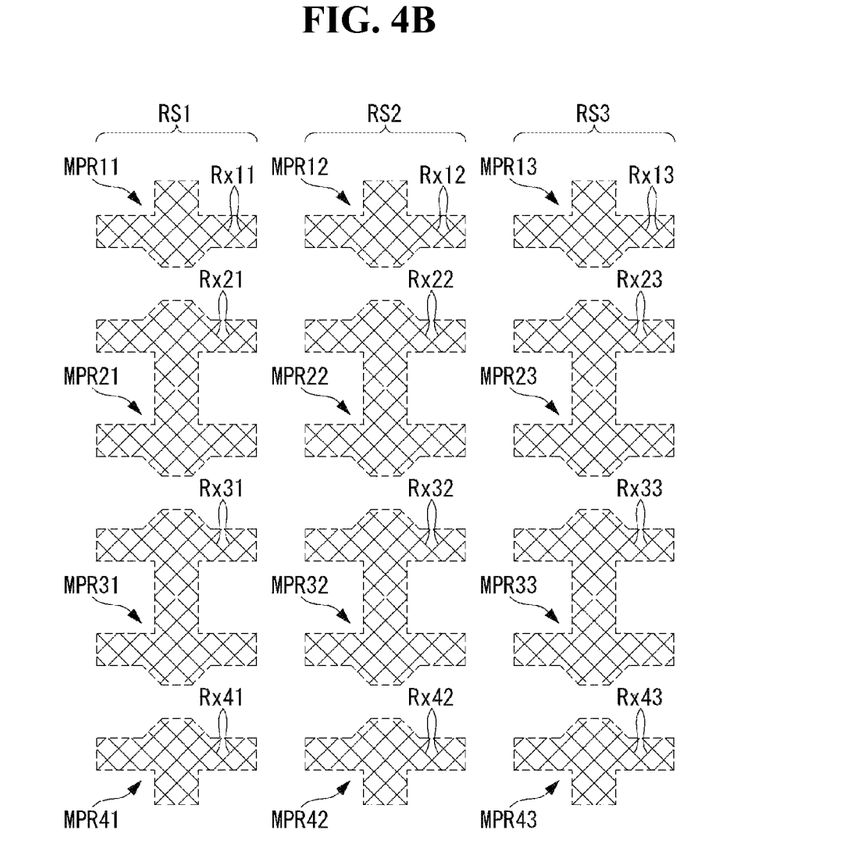
FIG. 4B is a plane view showing second touch electrode serials of the metal mesh type touch screen panel shown in FIG. 3.
Figure 5:
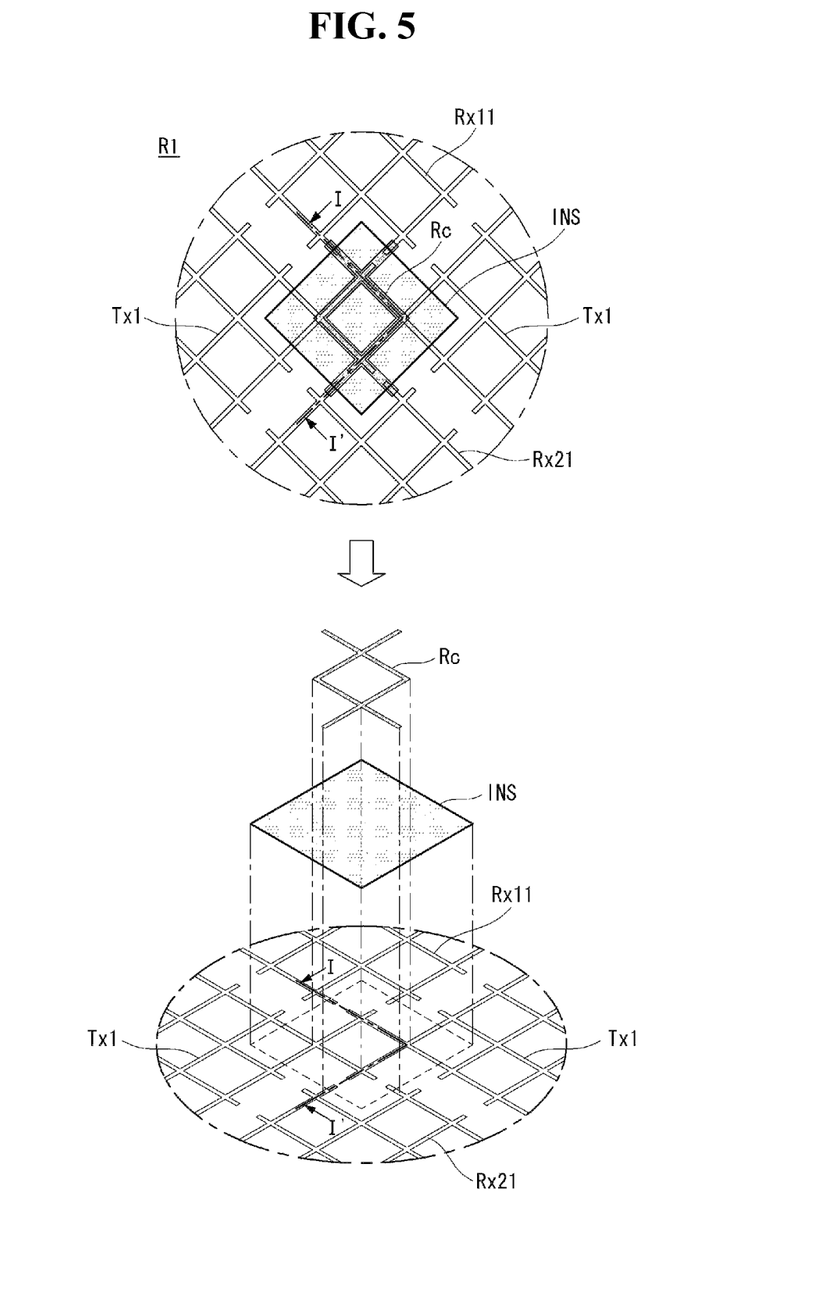
FIG. 5 is an enlarged plane view of a portion R1 shown in FIG. 3.
Figure 6:
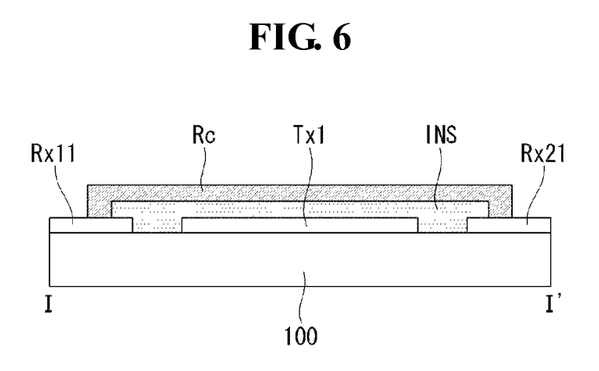
FIG. 6 is a cross-sectional view taken along line I-I' of FIG. 5.

A metal mesh type touch screen panel according to an exemplary embodiment of the invention is described below with reference to FIGS. 3 to 6. FIG. 3 is a plane view of a metal mesh type touch screen panel according to an exemplary embodiment of the invention. FIG. 4A is a plane view showing first touch electrode serials of the metal mesh type touch screen panel shown in FIG. 3, and FIG. 4B is a plane view showing second touch electrode serials of the metal mesh type touch screen panel shown in FIG. 3. FIG. 5 is an enlarged plane view of a portion R1 shown in FIG. 3. FIG. 6 is a cross-sectional view taken along line I-I' of FIG. 5.

As shown in FIGS. 3 to 6, the mesh type touch screen panel according to the embodiment of the invention includes a touch area A, a routing wiring area B in which routing wires are formed so as to transmit and receive signals to and from touch electrode serials of the touch area A, and a pad area C in which routing pads for connecting the routing wires and signal lines of a touch driving circuit are formed.

The touch area A includes a plurality of first touch electrode serials TS1 to TS3 and a plurality of second touch electrode serials RS1 to RS3.

The plurality of first touch electrode serials TS1 to TS3 are formed on a transparent substrate 100 and are arranged in parallel in a first direction (for example, x-axis direction). As shown in FIG. 4A, in the plurality of first touch electrode serials TS1 to TS3, the 1-1 touch electrode serial TS1 arranged on a first line of the touch area A includes a plurality of 1-1 mesh patterns MPT11, MPT12, MPT13, and MPT14 which are connected to one another; the 1-2 touch electrode serial TS2 arranged on a second line of the touch area A includes a plurality of 1-2 mesh patterns MPT21, MPT22, MPT23, and MPT24 which are connected to one another; and the 1-3 touch electrode serial TS3 arranged on a third line of the touch area A includes a plurality of 1-3 mesh patterns MPT31, MPT32, MPT33, and MPT34 which are connected to one another.

Each of the 1-1 mesh patterns MPT11, MPT12, MPT13, and MPT14 are formed by an intersection of a plurality of 1-1 metal lines Tx1; each of the 1-2 mesh patterns MPT21, MPT22, MPT23, and MPT24 are formed by an intersection of a plurality of 1-2 metal lines Tx2; and each of the 1-3 mesh patterns MPT31, MPT32, MPT33, and MPT34 are formed by an intersection of a plurality of 1-3 metal lines Tx3.

The 1-1 mesh patterns MPT11, MPT12, MPT13, and MPT14 and the 1-2 mesh patterns MPT21, MPT22, MPT23, and MPT24, which are adjacent to each other in a y-axis direction, are separated from each other so that they do not contact each other. Further, the 1-2 mesh patterns MPT21, MPT22, MPT23, and MPT24 and the 1-3 mesh patterns MPT31, MPT32, MPT33, and MPT34, which are adjacent to each other in the y-axis direction, are separated from each other so that they do not contact each other.

The plurality of second touch electrode serials RS1 to RS3 are formed on the transparent substrate 100 and are arranged in parallel in a second direction (for example, y-axis direction) crossing the first direction. As shown in FIG. 4B, in the plurality of second touch electrode serials RS1 to RS3, the 2-1 touch electrode serial RS1 arranged on a first column of the touch area A includes a plurality of 2-1 mesh patterns MPR11, MPR21, MPR31, and MPR41 and bridges Rc for connecting the adjacent 2-1 mesh patterns; the 2-2 touch electrode serial RS2 arranged on a second column of the touch area A includes a plurality of 2-2 mesh patterns MPR12, MPR22, MPR32, and MPR42 and bridges Rc for connecting the adjacent 2-2 mesh patterns; and the 2-3 touch electrode serial RS3 arranged on a third column of the touch area A includes a plurality of 2-3 mesh patterns MPR13, MPR23, MPR33, and MPR43 and bridges Rc for connecting the adjacent 2-3 mesh patterns.

Each of the plurality of 2-1 mesh patterns MPR11, MPR21, MPR31, and MPR41 are formed by an intersection of a plurality of 2-1 metal lines Rx1; each of the plurality of 2-2 mesh patterns MPR12, MPR22, MPR32, and MPR42 are formed by an intersection of a plurality of 2-2 metal lines Rx2; and each of the plurality of 2-3 mesh patterns MPR13, MPR23, MPR33, and MPR43 are formed by an intersection of a plurality of 2-3 metal lines Rx3.

In the 2-1, 2-2, and 2-3 mesh patterns, the adjacent mesh patterns in the x-axis direction are separated from each other so that they contact each other, and the adjacent mesh patterns in the y-axis direction are connected to each other through the bridge.

Accordingly, as shown in FIGS. 3 and 4A, the plurality of first touch electrode serials TS1 to TS3 include the mesh patterns MPT11, MPT12, MPT13, and MPT14 of the first line arranged in the x-axis direction, the mesh patterns MPT21, MPT22, MPT23, and MPT24 of the second line arranged in the x-axis direction, and the mesh patterns MPT31, MPT32, MPT33, and MPT34 of the third line arranged in the x-axis direction. The plurality of second touch electrode serials RS1 to RS3 include the mesh patterns MPR11, MPR21, MPR31, and MPR41 of the first column arranged in the y-axis direction, the mesh patterns MPR12, MPR22, MPR32, and MPR42 of the second column arranged in the y-axis direction, and the mesh patterns MPR13, MPR23, MPR33, and MPR43 of the third column arranged in the y-axis direction.

The mesh patterns MPT11, MPT12, MPT13, and MPT14 of the first line are connected to the same routing pad through routing wires described later, and the mesh patterns MPT21, MPT22, MPT23, and MPT24 of the second line are connected to the same routing pad through routing wires described later. Therefore, the mesh patterns of each line in the x-axis direction are connected to one another and thus form a touch electrode of the x-axis direction.

On the other hand, the mesh patterns MPR11, MPR21, MPR31, MPR41; MPR12, MPR22, MPR32, MPR42; MPR13, MPR23, MPR33, MPR43 of the first, second, and third columns arranged in the y-axis direction are connected to individual routing pads through routing wires described later on a per column basis, and thus form a touch electrode of the y-axis direction.

Accordingly, the touch electrodes of the x-axis direction and the touch electrodes of the y-axis direction may perform a touch sensing operation by a crossing structure thereof, thereby making it possible to function as the touch screen panel.

Because each of the mesh patterns configuring the first and second touch electrode serials is formed through a combination of the electrode lines, each mesh pattern may have various shapes. FIG. 3 shows the mesh patterns having a dragonfly shape as an example. Other shapes may be used. For example, each mesh pattern may have a triangle shape, a rectangle shape, a diamond shape, a polygon shape, a circle shape, an oval shape, a combination thereof, or a stripe shape having a uniform width using the electrode lines.

The touch screen panel according to the embodiment of the invention additionally includes an insulating pattern INS for electrically insulating the first touch electrode serials TS1 to TS3 and the second touch electrode serials RS1 to RS3, which are disposed to cross each other. As shown in FIGS. 3, 5, and 6, the first metal lines Tx1 configuring the 1-1 mesh patterns MPT12 and MPT13 of the 1-1 touch electrode serial TS1 and the second metal lines Rx12 and Rx22 configuring the 2-2 mesh patterns MPR12 and MPR22 of the 2-2 touch electrode serial RS2 are formed on the transparent substrate 100. The insulating pattern INS for covering the first metal lines Tx1 is formed at crossings between the first metal lines Tx1 and the second metal lines Rx12 and Rx22. The second metal lines Rx12 and Rx22 configuring the 2-2 mesh patterns MPR12 and MPR22 are disconnected so that the second metal lines Rx12 and Rx22 do not contact the first metal lines Tx1. Therefore, the bridge Rc formed on the insulating pattern INS is configured to electrically connect the disconnected second metal lines Rx12 and Rx22.

In the embodiment of the invention, the first metal lines Tx1, TX2, and Tx3, the second metal lines Rx11, Rx12, Rx13, Rx21, Rx22, Rx23, Rx31, Rx32, Rx33, Rx41, and Rx42, Rx43, and the bridges Rc are formed of a metal material such as Al, AlNd, Mo, MoTi, Cu, Cr, Ag, and Ag-based alloys. As described above, because the mesh patterns and the bridges configuring the first and second touch electrode serials are formed using a metal material having a specific resistance much less than a transparent electrode such as indium tin oxide (ITO), the entire resistance may be reduced. Hence, the RC delay may be reduced. Therefore, even if the size of the touch screen panel increases, the accuracy of the touch recognition may be kept at a predetermined level.

A width of each of the first and second metal lines is about 2 μm to 15 μm. When the width of each metal line is less than about 2 it is difficult to perform a patterning operation because of characteristics of a semiconductor equipment. When the width of each metal line is greater than about 15 μm, a user may perceive the metal lines through his or her eyes.

Further, a distance between the metal lines configuring each mesh pattern is about 50 μm to 500 μm. When the distance between the metal lines is less than about 50 μm, the metal lines are densely disposed, and thus visibility is reduced. When the distance between the metal lines is greater than about 500 μm, electrical conductivity is reduced.

A distance between the 1-1 metal lines Tx1 configuring the 1-1 mesh patterns MPT11, MPT12, MPT13, and MPT14 and the 1-2 metal lines Tx2 configuring the 1-2 mesh patterns MPT21, MPT22, MPT23, and MPT24; a distance between the 1-2 metal lines Tx2 configuring the 1-2 mesh patterns MPT21, MPT22, MPT23, and MPT24 and the 1-3 metal lines Tx3 configuring the 1-3 mesh patterns MPT31, MPT32, MPT33, and MPT34; and a distance between the first metal lines Tx1, TX2, and Tx3 and the second metal lines Rx11, Rx12, Rx13, Rx21, Rx22, Rx23, Rx31, Rx32, Rx33, Rx41, Rx42, and Rx43 are about 5 μm to 200 μm. When the distances are less than about 5 μm, the problem of the short circuit is likely to be generated. When the distances are greater than about 200 μm, the visibility is reduced because of a difference between a formation portion of the metal lines and a non-formation portion of the metal lines.

The embodiment of the invention described that the insulating pattern is formed only at the crossing between the first touch electrode serial and the second touch electrode serial, thereby preventing the first metal lines configuring the first touch electrode serial from contacting the second metal lines configuring the second touch electrode serial, but is not limited thereto. For example, the embodiment of the invention may be configured, so that the bridges are first formed on the transparent substrate, an insulating layer for covering the bridges is formed, after a contact hole exposing both ends of each bridge is formed in the insulating layer, the first metal lines and the second metal lines are formed on the insulating layer in a crossing direction thereof so that they do not contact each other, and the disconnected metal lines at the crossing are connected through the bridge.

The routing wiring area B is formed outside the touch area A and includes a plurality of first routing wires TW1, TW2, and TW3 and a plurality of second routing wires RW1, RW2, and RW3.

In the plurality of first routing wires TW1, TW2, and TW3, the 1-1 routing wire TW1 is connected to one end of the metal line Tx1 included in the 1-1 mesh pattern MPT14 of the 1-1 touch electrode serial TS1; the 1-2 routing wire TW2 is connected to one end of the metal line Tx2 included in the 1-2 mesh pattern MPT24 of the 1-2 touch electrode serial TS2; and the 1-3 routing wire TW3 is connected to one end of the metal line Tx3 included in the 1-3 mesh pattern MPT34 of the 1-3 touch electrode serial TS3.

In the plurality of second routing wires RW1, RW2, and RW3, the 2-1 routing wire RW1 is connected to one end of the metal line Rx41 included in the 2-1 mesh pattern MPR41 of the 2-1 touch electrode serial RS1; the 2-2 routing wire RW2 is connected to one end of the metal line Rx42 included in the 2-2 mesh pattern MPR42 of the 2-2 touch electrode serial RS2; and the 2-3 routing wire RW3 is connected to one end of the metal line Rx43 included in the 2-3 mesh pattern MPR43 of the 2-3 touch electrode serial RS3.

The routing wiring area B is formed to surround the first and second touch electrode serials TS1 to TS3 and RS1 to RS3 and the first and second routing wires TW1 to TW3 and RW1 to RW3. The routing wiring area B further includes a first ground line G1 for protecting the touch electrode serials TS1 to TS3 and RS1 to RS3 and the routing wires TW1 to TW3 and RW1 to RW3 from static electricity entering from the outsides, and a second ground line G2 which is disposed between the adjacent first and second routing wires TW3 and RW3 and prevents an electrical interference between the first and second routing wires TW3 and RW3.

The first routing wires TW1 to TW3, the second routing wires RW1 to RW3, and the first and second ground lines G1 and G2 formed in the routing wiring area B are formed using a metal material such as Al, AlNd, Mo, MoTi, Cu, Cr, Ag, and alloys thereof.

The pad area C is formed outside the routing wiring area B and includes a plurality of first routing pads TP1, TP2, and TP3 and a plurality of second routing pads RP1, RP2, and RP3.

In the plurality of first routing pads TP1, TP2, and TP3, the 1-1 routing pad TP1 is connected to the metal line Tx1 included in the 1-1 mesh pattern MPT14 of the 1-1 touch electrode serial TS1 through the 1-1 routing wire TW1; the 1-2 routing pad TP2 is connected to the metal line Tx2 included in the 1-2 mesh pattern MPT24 of the 1-2 touch electrode serial TS2 through the 1-2 routing wire TW2; and the 1-3 routing pad TP3 is connected to the metal line Tx3 included in the 1-3 mesh pattern MPT34 of the 1-3 touch electrode serial TS3 through the 1-3 routing wire TW3.

The pad area C further includes the first routing pads TP1 to TP3 connected to the first routing wires TW1 to TW3, the second routing pads RP1 to RP3 connected to the second routing wires RW1 to RW3, first ground pads GP1a and GP1b connected to both ends of the first ground line G1, and a second ground pad GP2 connected to one end of the second ground line G2.

The first routing pads TP1 to TP3, the second routing pads RP1 to RP3, and the ground pads GP1a, GP1b, and GP2 formed in the pad area C are formed using a metal material such as Al, AlNd, Mo, MoTi, Cu, Cr, Ag, and alloys thereof.

Figure 7A:
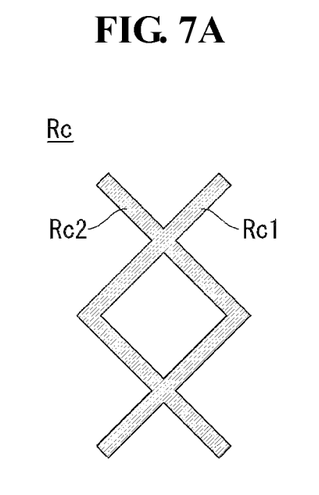
FIGS. 7A to 7C are plane views illustrating various examples of a bridge shown in FIG. 5.
Figure 7B:
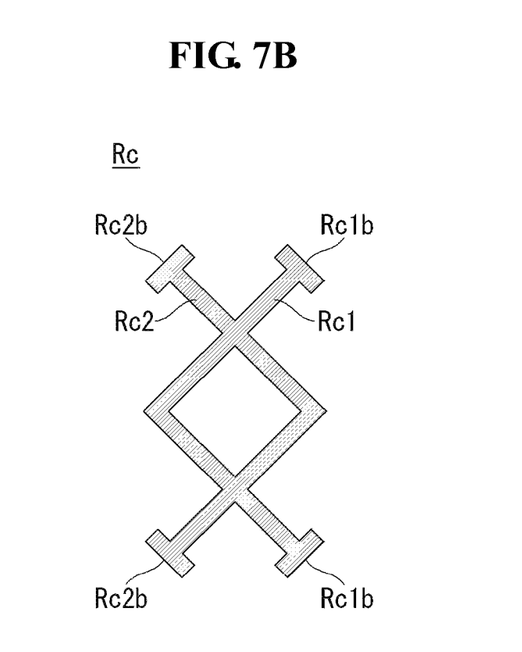
Figure 7C:
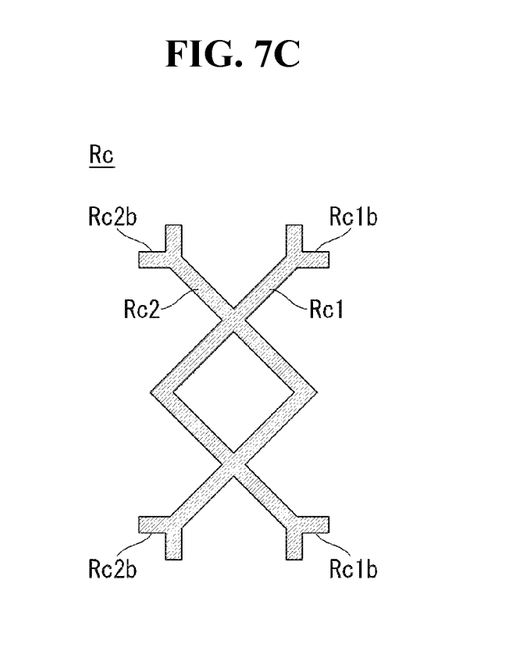

The bridge Rc according to the embodiment of the invention is described below with reference to FIGS. 7A to 7C. FIGS. 7A to 7C are plane views illustrating various examples of the bridge shown in FIG. 5.

As shown in FIGS. 7A to 7C, the bridge Rc for connecting the adjacent mesh patterns of the second touch electrode serial is formed by an intersection of a first bridge metal line Rc1 and a second bridge metal line Rc2. FIGS. 7A to 7C show the bridge Rc having protruding ends by cross-linking the '⊓'-shaped first bridge metal line Rc1 with the '⌊'-shaped second bridge metal line Rc2. More specifically, FIG. 7A illustrates an example where both ends of the bridge Rc contacting the adjacent mesh patterns of the second touch electrode serial have an I-shape. FIG. 7B illustrates an example where both ends of the first and second bridge metal lines Rc1 and Rc2 of the bridge Rc contacting the adjacent mesh patterns of the second touch electrode serial have T-shaped branches Rc1b and Rc2b, respectively. FIG. 7C illustrates an example where both ends of the first and second bridge metal lines Rc1 and Rc2 of the bridge Rc contacting the adjacent mesh patterns of the second touch electrode serial have Y-shaped branches Rc1b and Rc2b, respectively.

As shown in FIG. 7A, when the bridge Rc is not accurately aligned, the positions of the electrode lines of the mesh pattern of the second touch electrode serial, which will contact the bridge Rc, may be out of alignment because the protruding ends of the first and second bridge metal lines Rc1 and Rc2 have the I-shape. On the other hand, as shown in FIG. 7B, the both ends of the first and second bridge metal lines Rc1 and Rc2 of the bridge Rc have the T-shaped branches Rc1b and Rc2b. Therefore, even if the positions of the electrode lines of the mesh pattern of the second touch electrode serial, which will contact the bridge Rc, are out of alignment, the first and second bridge metal lines Rc1 and Rc2 may easily contact the electrode lines of the mesh pattern of the second touch electrode serial using the T-shaped branches Rc1b and Rc2b. Further, as shown in FIG. 7C, the both ends of the first and second bridge metal lines Rc1 and Rc2 of the bridge Rc have the Y-shaped branches Rc1b and Rc2b. Therefore, even if the positions of the electrode lines of the mesh pattern of the second touch electrode serial, which will contact the bridge Rc, are out of alignment, the first and second bridge metal lines Rc1 and Rc2 may easily contact the electrode lines of the mesh pattern of the second touch electrode serial using the Y-shaped branches Rc1b and Rc2b.

The embodiment of the invention illustrated in FIGS. 7A to 7C described that the bridge Rc is formed by cross-linking one '⊓'-shaped first bridge metal line Rc1 with one '⌊'-shaped second bridge metal line Rc2, but is not limited thereto. For example, the plurality of first bridge metal lines Rc1 and the plurality of second bridge metal lines Rc2 may be used to form the bridge Rc. Further, the numbers of first and second bridge metal lines Rc1 and Rc2 used to form the bridge Rc may be different from each other.

Further, the embodiment of the invention described that the first and second bridge metal lines Rc1 and Rc2 of the bridge Rc and the electrode lines of the mesh pattern of the second touch electrode serial are arranged in the same direction, but is not limited thereto. For example, the first and second bridge metal lines Rc1 and Rc2 may be formed to cross each other irrespective of the arrangement direction of the electrode lines of the mesh pattern of the second touch electrode serial. In this instance, the ends of the first and second bridge metal lines Rc1 and Rc2 do not need to have the T-shape or the Y-shape.

Further, the embodiment of the invention described that the ends of the first and second bridge metal lines Rc1 and Rc2 have the I-shape, the T-shape, or the Y-shape, but is not limited thereto. In other words, the ends of the first and second bridge metal lines Rc1 and Rc2 may have any shape as long as the first and second bridge metal lines Rc1 and Rc2 can easily contact the electrode lines of the mesh pattern of the second touch electrode serial.

Further, the embodiment of the invention described that the metal mesh type touch screen panel is formed on the transparent substrate, but is not limited thereto. For example, the metal mesh type touch screen panel according to the embodiment of the invention may be formed on a window cover (formed of tempered glass, for example) of the display device or may be directly formed on a color filter array substrate of the display device.

An example of the metal mesh type touch screen panel formed on a window cover is described below with reference to FIG. 8.

Figure 8:
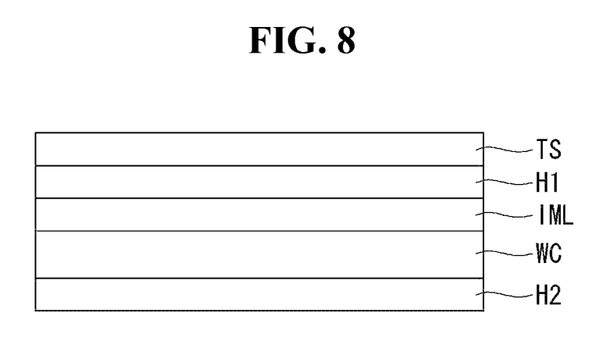
FIG. 8 is a cross-sectional view showing an example of a metal mesh type touch screen panel formed on a window cover.

FIG. 8 is a cross-sectional view showing an example of the metal mesh type touch screen panel formed on a window cover.

As shown in FIG. 8, the metal mesh type touch screen panel includes a window cover WC, an index matching layer IML, a first haze processing layer H1, and a metal mesh type touch electrode layer TS, which are sequentially formed on one surface of the window cover WC, and a second haze processing layer H2 formed on the other surface of the window cover WC. In the metal mesh type touch screen panel, a protective layer (not shown) for protecting the touch electrode layer TS may be formed on the touch electrode layer TS.

In the metal mesh type touch screen panel shown in FIG. 8, the index matching layer IML adjusts a reflectance to thereby improve the visibility of the touch screen panel. The index matching layer IML is formed using $Nb_2O_5$ or $SiO_2$, etc. The first and second haze processing layers H1 and H2 are configured so that the patterns of the metal lines forming the touch electrode are not seen using minute particles included in the first and second haze processing layers H1 and H2. One of the first and second haze processing layers H1 and H2 may be omitted.

In the metal mesh type touch screen panel according to the embodiment of the invention, because the touch electrodes are formed using the metal material having the relatively low specific resistance instead of ITO having the high specific resistance, the touch sensitivity of the touch screen panel may be improved through a reduction in the resistance.

The technical effects of the metal mesh type touch screen panel according to the embodiment of the invention are described in detail with reference to the following Table 1.

The following Table 1 is a simulation table comparing a related art touch screen panel, in which the touch electrode serials are formed of ITO, with touch screen panels according to embodiments of the invention, in which the mesh patterns of the touch electrode serials are formed using the metal lines, based on a time constant.

TABLE 1

|  | Related Art | First Embodiment | Second Embodiment | Third Embodiment |
|---|---|---|---|---|
| Channel (first touch electrode serial × second touch electrode serial) | 77 × 44 | 77 × 44 | 77 × 44 | 77 × 44 |
| Time constant of first touch electrode serial (ns) | 2033 | 644 | 727 | 765 |
| Time constant of second touch electrode serial (ns) | 1002 | 348 | 429 | 405 |

In the above Table 1, the ITO electrodes in the related art touch screen panel had a diamond shape; the mesh patterns formed using the metal lines in a first embodiment had a diamond shape; the mesh patterns formed using the metal lines in a second embodiment had a dragonfly shape; and the mesh patterns formed using the metal lines in a third embodiment had a modified dragonfly shape. Further, in Table 1, the number of first touch electrode serials was 77 (i.e., 77 channels), and the number of second touch electrode serials was 44 (i.e., 44 channels).

In general, the touch sensitivity of the touch screen panel is inversely proportional to the time constant of the touch electrode serial. The time constant is obtained by multiplying a resistance by a capacitance, and thus is proportional to a resistance and a capacitance of the touch electrode serial. Thus, as the resistance and the capacitance of the touch electrode serial increase, the touch sensitivity of the touch screen panel is reduced.

As indicated by Table 1, the time constant of the first touch electrode serial in the related art touch screen panel was 2,033 ns, and the time constants of the first touch electrode serials in the first to third embodiments were 644 ns, 727 ns, and 765 ns, respectively. Thus, the first to third embodiments obtained the performance improvement of about 62% to 68% in the first touch electrode serials. Further, the time constant of the second touch electrode serial in the related art touch screen panel was 1,002 ns, and the time constants of the second touch electrode serials in the first to third embodiments were 348 ns, 429 ns, 405 ns, respectively. Thus, the first to third embodiments obtained the performance improvement of about 57% to 65% in the second touch electrode serials.

Although embodiments have been described with reference to a number of illustrative embodiments thereof, it should be understood that numerous other modifications and embodiments can be devised by those skilled in the art that will fall within the scope of the principles of this disclosure. For example, the embodiments of the invention described that the first touch electrode serial is a driving electrode serial and the second touch electrode serial is a sensing electrode serial, but the reverse case is possible. Further, it should be understood that the number of first and second touch electrode serials, the number of first and second routing wires, and the number of first and second routing pads described in the embodiments of the invention are merely an example. The numbers may increase or decrease, if necessary or desired. Further, the embodiments of the invention described that the metal mesh type touch screen panel is formed on the transparent substrate or the window cover. However, the first and second touch electrode serials may be formed on a separate film and then may be attached to each other. Alternatively, the metal mesh type touch screen panel may be directly formed on the color filter array substrate of the display device. Accordingly, the scope of the present invention should not be limited by the exemplary embodiments, but should be defined by the appended claims.

What is claimed is:

1. A touch screen panel, comprising:
a plurality of first touch electrode serials arranged in a first direction;
a plurality of second touch electrode serials arranged in a second direction crossing the first direction to cross the plurality of first touch electrode serials; and
an insulating layer configured to insulate the plurality of first touch electrode serials and the plurality of second touch electrode serials,
wherein each of the plurality of first touch electrode serials includes a plurality of first mesh patterns formed by an intersection of first metal lines,
wherein each of the plurality of second touch electrode serials includes a plurality of second mesh patterns formed by an intersection of second metal lines,
wherein the plurality of first mesh patterns are connected to one another, and the plurality of second mesh patterns are separated from one another,
wherein the separated second mesh patterns are connected to one another through a bridge,
wherein the bridge includes at least one first bridge metal line and at least one second bridge metal line,
wherein the at least one first bridge metal line and the at least one second bridge metal line cross each other and form the same mesh pattern as the first mesh pattern or the second mesh pattern, and
wherein ends protrude from a crossing between the at least one first bridge metal line and the at least one second bridge metal line.

2. The touch screen panel of claim 1, wherein the insulating layer is formed at crossings of the first touch electrode serials and the second touch electrode serials,
wherein the bridge is formed on the insulating layer and connects the separated mesh patterns.

3. The touch screen panel of claim 1, wherein the insulating layer is formed at crossings of the first touch electrode serials and the second touch electrode serials,
wherein the bridge is formed under the insulating layer and connects the separated mesh patterns.

4. The touch screen panel of claim 1,
wherein both ends of the at least one first bridge metal line connect the separated mesh patterns.

5. The touch screen panel of claim 1,
wherein the ends that protrude from the crossing between the at least one first bridge metal line and the at least one second bridge metal line have another ends protruding from the ends.

6. The touch screen panel of claim 1, wherein each of the first and second metal lines has a width of about 2 μm to 15 μm.

7. The touch screen panel of claim 1, wherein a distance between the first metal lines and a distance between the second metal lines are about 50 μm to 500 μm.

8. The touch screen panel of claim 1, wherein a distance between the separated mesh patterns is about 5 μm to 200 μm.

9. The touch screen panel of claim 1, wherein the first and second metal lines are selected among metal materials such as Al, AlNd, Mo, MoTi, Cu, Cr, Ag, and Ag-based alloys.

10. The touch screen panel of claim 1, wherein the ends that protrude from the crossing between the at least one first bridge metal line and the at least one second bridge metal line have an I-shape.

11. A touch screen panel, comprising:
a plurality of first touch electrode serials arranged in a first direction;
a plurality of second touch electrode serials arranged in a second direction crossing the first direction to cross the plurality of first touch electrode serials; and
an insulating layer configured to insulate the plurality of first touch electrode serials and the plurality of second touch electrode serials,
wherein each of the plurality of first touch electrode serials includes a plurality of first mesh patterns formed by an intersection of first metal lines,
wherein each of the plurality of second touch electrode serials includes a plurality of second mesh patterns formed by an intersection of second metal lines,
wherein the plurality of first mesh patterns are connected to one another, and the plurality of second mesh patterns are separated from one another,
wherein the separated second mesh patterns are connected to one another through a bridge,
wherein the bridge includes at least one first bridge metal line having at least one curved portion,
wherein both ends of the at least one first bridge metal line connect the separated mesh patterns,
wherein the bridge further includes at least one second bridge metal line having at least one curved portion,
wherein the at least one first bridge metal line and the at least one second bridge metal line cross each other and form the same mesh pattern as the first mesh pattern or the second mesh pattern, and
wherein ends protrude from a crossing between the at least one first bridge metal line and the at least one second bridge metal line.

12. The touch screen panel of claim 11, wherein the ends that protrude from the crossing between the at least one first bridge metal line and the at least one second bridge metal line have an I-shape.

* * * * *